US011916650B2

(12) United States Patent
Knopp et al.

(10) Patent No.: US 11,916,650 B2
(45) Date of Patent: Feb. 27, 2024

(54) SATELLITE COMMUNICATIONS SYSTEM AND METHOD FOR TRANSMITTING A BIT STREAM THEREWITH

(71) Applicant: NEOSAT GmbH, Neubiberg (DE)

(72) Inventors: Andreas Knopp, Bad Elster (DE); Christian Hofmann, Munich (DE); Robert Schwarz, Haar (DE); Stephan Winter, Schondorf am Ammersee (DE); Matthias Schraml, Thumsenreuth (DE)

(73) Assignee: NEOSAT GMBH, Neubiberg (DE)

( * ) Notice: Subject to any disclaimer, the term of this patent is extended or adjusted under 35 U.S.C. 154(b) by 413 days.

(21) Appl. No.: 17/286,070

(22) PCT Filed: Oct. 18, 2019

(86) PCT No.: PCT/EP2019/078440
§ 371 (c)(1),
(2) Date: Apr. 16, 2021

(87) PCT Pub. No.: WO2020/079259
PCT Pub. Date: Apr. 23, 2020

(65) Prior Publication Data
US 2021/0376916 A1 Dec. 2, 2021

(30) Foreign Application Priority Data
Oct. 19, 2018 (EP) .................................. 18201572

(51) Int. Cl.
*H04B 7/185* (2006.01)
*H04L 27/36* (2006.01)

(52) U.S. Cl.
CPC ....... *H04B 7/18515* (2013.01); *H04L 27/362* (2013.01)

(58) Field of Classification Search
CPC ...... H04B 7/04026; H04B 7/04; H04B 7/022; H04B 7/024; H04B 7/18515; H04M 5/00; H04L 27/362; H04L 27/2071
See application file for complete search history.

(56) References Cited

U.S. PATENT DOCUMENTS

| | | | | |
|---|---|---|---|---|
| 6,115,366 A | * | 9/2000 | Campanella | ....... H04B 7/18523 455/12.1 |
| 2014/0286238 A1 | * | 9/2014 | Erceg | .................... H04W 80/00 370/328 |

(Continued)

FOREIGN PATENT DOCUMENTS

| | | |
|---|---|---|
| EP | 3291471 A1 | 3/2018 |
| GB | 2 534 253 | 7/2016 |

OTHER PUBLICATIONS

PCT International Search Report and Written Opinion for corresponding PCT Application No. PCT/EP2019/078440, dated Nov. 27, 2019, 8 pages.

*Primary Examiner* — Fred A Casca
(74) *Attorney, Agent, or Firm* — Dority & Manning, P.A.

(57) ABSTRACT

The present invention relates to a satellite communications system comprising a satellite with a spatial digital modulator for transmitting an incoming bit stream in multiple beams, wherein the spatial digital modulator is configured to generate transmit symbols by dividing the incoming bit stream into symbols of a symbol alphabet and to allocate each transmit symbol to a specific beam. The invention further relates to a method for transmitting a bit stream by such a satellite communications system.

19 Claims, 5 Drawing Sheets

(56) References Cited

U.S. PATENT DOCUMENTS

2017/0155440 A1* 6/2017 Sun ..................... H04B 7/0632
2018/0014261 A1 1/2018 Miranda et al.

* cited by examiner

SATELLITE COMMUNICATIONS SYSTEM AND METHOD FOR TRANSMITTING A BIT STREAM THEREWITH

This application is a national phase entry of PCT International Application No. PCT/EP2019/078440 filed on Oct. 18, 2019, which, in turn, is based upon and claims the right of priority to EP Patent Application No. 18201572.7 filed on Oct. 19, 2018, the disclosures of both of which are hereby incorporated by reference herein in their entirety for all purposes.

The invention relates to a satellite communications system and a method for transmitting a bit stream by such a satellite communications system.

In satellite communications the demand for high throughput is ever increasing. Broadband applications such as video on demand and interactive web services constitute only some of the applications that require high throughput. The demand for increasing throughput has lead to the development and deployment of so-called high throughput satellites (HTSs). Due to further developments in the satellite industry satellite capacities in the terabit per second range are to be expected in the near future. A key technology to achieve such high transmission rates is the deployment of a multi-beam antenna design to provide a mesh of small spot beams in a limited service area, thereby allowing a spectral efficient reuse of frequencies. Current in-orbit high throughput satellites often apply a four-color frequency re-use pattern that uses four orthogonal frequency resources formed by two different frequencies and two different polarizations. Thereby downlink interference between directly adjacent beams can be avoided as either different frequencies or different polarizations are employed. However, utilization of the frequency spectrum is rather inefficient.

More recently full frequency reuse has been contemplated, i.e., the direct reuse of the frequency spectrum in an adjacent beam. With this approach the entire frequency spectrum is employed in the downlink from a multi-beam high throughput satellite to a ground station in the entire service area of the satellite. However, with such an approach inter-beam interferences, also called co-channel interferences (CCI), cannot be avoided, i.e., signals of adjacent beams will interfere with each other at certain time instances. The amount of interference depends on the gain decoupling of the beams. The stronger a beam suppresses its signal in the areas of the adjacent beams on ground, the weaker the resultant interference.

To transmit a digital signal in form of a bit stream from a satellite to a ground station over an analog communication channel the bit stream becomes digitally modulated. In digital modulation an analog carrier signal is modulated depending on the bit stream to be transmitted. For this the bit stream is divided into groupings of bits, i.e., groups of 1, 2 or more bits, and each grouping of bits is mapped to a particular state of the carrier signal. The state of the carrier signal is called a symbol, and it is defined as having a specific phase, magnitude and/or frequency. All possible different states of the carrier signal for groupings with a certain number of bits are called symbol alphabet (also called modulation alphabet) with its number of alternative symbols being finite. Each symbol can be represented as a complex number, modulating the carrier signal with its real part (also called in phase part) and imaginary part (also called quadrature part), respectively, and visualized on the complex plane in a constellation diagram. The complex numbers that represent the symbols are called constellation points.

Di Renzo, M., et al., "Spatial Modulation for Generalized MIMO: Challenges, Opportunities, and Implementation", Proceedings of the IEEE, volume 102, issue 1, January 2014, pages 56-103, https://doi.org/10.1109/JPROC.2013.2287851, addresses the issue of striking a compromise between wireless network's area spectral efficiency and energy efficiency and proposes to use spatial modulation (SM) for single-radio-frequency (RF) large-scale multiple-input-multiple-output (MIMO) communications.

An issue in satellite communications can be the eavesdropping resistance of the transmitted satellite signal. In particular if security-relevant information shall be transmitted by satellite to individual users the problem arises that the corresponding signals might be intercepted from other positions on the Earth's surface or in the air.

The security of data transmission by means of satellite communications has been addressed on different levels of the Open Systems Interconnection model (OSI model) that characterizes the respective communication functions. Physical layer security techniques are, for example, studied in Zheng, G., et al., "Physical layer security in multibeam satellite systems", IEEE Transactions on Wireless Communications, volume 11, issue 2, February 2012, pages 852-863, https://doi.org/10.1109/TWC.2011.120911.111460. This article also explores the use of artificial noise as an additional degree-of-freedom for protection against eavesdroppers. Further, data to be transmitted may be encrypted at the sending side. Still further, particular ways of network coding may be used that offer improved eavesdropping protection. Moreover, spread spectrum methods may be used to disguise the security-relevant signals.

However, encryption methods and similar require the exchange of keys and additional synchronization. Furthermore, bandwidth efficiency is reduced due to the required protocol overhead. Similar drawbacks are encountered with network coding and spread spectrum methods. The known approaches do also not provide complete safety. I.e., complete physical/information theoretical eavesdropping resistance cannot be guaranteed with these approaches.

Following the above, it is an object of the present invention to provide a satellite communications system and a method for transmitting a bit stream therewith that can realize a higher-order symbol alphabet in the payload of the satellite, in particular its one or more power amplifiers. It is a further object of the present invention to provide a satellite communications system and a method for transmitting a bit stream therewith that provides improved eavesdropping resistance.

In order to implement these and still further objects of the invention, which will become more readily apparent as the description proceeds, a satellite communications system is provided that comprises a satellite with a spatial digital modulator for modulating an incoming bit stream and generating multiple beams to transmit the signals. The spatial digital modulator is configured to generate transmit symbols by dividing the incoming bit stream into symbols of a symbol alphabet and to allocate each transmit symbol to a specific beam, wherein at least some of the transmit symbols are allocated to different beams. The term "transmit symbols" describes the symbols that shall be transmitted. The beams are preferably downlink beams. However, the spatial digital modulator of the satellite communications system can also be at the uplink ground station and the signal used in the different beams is uplinked in a frequency division multiple access (FDMA) scheme.

Hence, with the present invention not all symbols of a symbol alphabet (also called modulation alphabet) are transmitted in the same beam. Instead the symbols and thus the constellation points representing the symbols in the complex plane are distributed over several beams for transmission. Such is called spatial modulation. Preferably, the symbol alphabet has a linear order, i.e., is a linear symbol alphabet. With the present invention a higher-order symbol alphabet can be realized using a multi-beam satellite architecture.

To implement this invention, the points of boresight (PoB) of the beams are not co-located. However, it is necessary to allocate two or more overlapping beams at the receiver location. The relative gain of each beam at the given position can be smaller than −3 dB, so the invention is applicable to contemporary fixed beam patterns as well as to a beam pattern generated by direct radiating arrays (DRA). By adapting the transmit power of each beam in such a way that the required bit error rate necessary to detect the transmitted symbols and to recover the information encoded therein is limited to a specific service area on the Earth's surface. Thereby, eavesdropping can be impeded.

According to a further preferred embodiment the spatial digital modulator is configured to use space-shift keying (SSK) or any linear amplitude-phase-modulation like amplitude-phase-shift keying (APSK) for encoding the transmit symbols. Space-shift keying is a specific form or subset of space modulation, wherein in a multi-beam scenario a non-modulated signal is transmitted via multiple beams using the beam index as the carrier of information. This corresponds to amplitude-phase-modulation with a modulation order of zero.

The number of beams required for transmission of the symbol alphabet, i.e., all of its symbols, depends on the intended overall modulation order. The overall modulation order determines the number of bits each symbol of the symbol alphabet contains. The overall modulation order may be predetermined and saved, for example in the spatial digital modulator. Alternatively, the overall modulation order may be selected by the spatial digital modulator based on the characteristics of the incoming bit stream.

The overall modulation order $m_{SM}$ is given by $$m_{SM} = \log 2\left(\sum_{N_{Beams}} 2^{m_{Beam}}\right)$$

where $N_{Beams}$ represents the number of used beams (beams used for transmission of the symbol alphabet) and $m_{Beam}$ the modulation order in the respective beam. The spatial digital modulator is preferentially configured to allocate each transmit symbol to a specific beam based on predefined fixed or dynamic mapping rules. Possible criteria for dynamic rules can be the average power in the respective transponder or minimized minimum Euclidean distance for the eavesdropper.

According to a further preferred embodiment of the invention the satellite is configured to add artificial noise to the transmit symbols. The adding of artificial noise can, for example, be performed by the payload or a transponder of the satellite. With the adding of artificial noise on the sensing site the signal-to-noise ratio (SNR) is reduced. This has the advantage that an eavesdropper cannot compensate the smaller minimum Euclidean distance by simply increasing the gain of the receiving antenna. Such artificially limiting of the signal-to-noise ratio can also be favorable in the prevention of eavesdropping if the legitimate receiver is affected by rain fading while the eavesdropper is under clear sky conditions.

According to a further preferred embodiment the satellite communications system of the invention comprises a receiving station (also called ground station or ground terminal). The spatial digital modulator is then configured to select the beams required for transmission of the symbol alphabet. Preferably, the receiving station is located inside the 6 dB-beamwidth of all satellite beams to be used for spatial modulation. Thereby, an eavesdropper at an arbitrary location within the satellite footprint, i.e., the produced beam pattern, experiences a severely degraded bit error rate, whereas at the same time the bit error rate at the legitimate receiver's site is minimized.

The satellite of the satellite communications system of the invention (in particular its payload or transponder) is preferably further configured to adjust the gains of the transponders, respectively the equivalent isotropic radiated power (EIRP) of the required beams in such a way that the minimum Euclidian distance between the transmit symbols which are received at the receiving station are optimized. The minimum Euclidian distance between the transmit symbols is denoted as the smallest of the Euclidian distances between their respective constellation points in the constellation diagram. The larger this distance is within a minimized area, the easier it is for the optimally positioned legitimate receiving station to detect and distinguish between the different symbols. On the other hand, eavesdropping resistance is improved through minimization of the service area, thus using beams having narrow beam widths.

The service area can also be controlled by the channel coding, e.g. Low-Density-Parity-Check-Code (LDPC). A non-optimal minimum Euclidean distance leads to increased bit errors. Smaller code rates result in larger service areas.

The invention can comprise several architectures. The transmit symbol are produced in the satellite and transmitted, e.g., by a transponder of the satellite to a feed system. This feed system transmits the symbols either in a multi-feed per beam or single-feed per beam layout to one or more reflectors. Hence, each antenna can comprise a reflector and one or multiple feeds. The emissions from the feeds are reflected by the reflectors and transmitted as multiple beams to the ground station. Also, a structure of direct radiating arrays or array fed reflectors is possible to generate multiple beams at the Earth's surface.

According to a further aspect of the invention a method for transmitting a bit stream by a satellite communications system according to the invention is provided, wherein an incoming bit stream is modulated by dividing the incoming bit stream into symbols of a symbol alphabet to generate transmit symbols and by allocating each transmit symbol to a specific beam generated by one of several spatially spaced apart antennas, wherein at least some of the transmit symbols are allocated to different beams.

Further advantageous features and applications of the invention can be found in the dependent claims as well as in the following description of the drawings illustrating the invention. In the drawings like reference signs designate the same or similar elements throughout the several figures of which:

Figure 1:
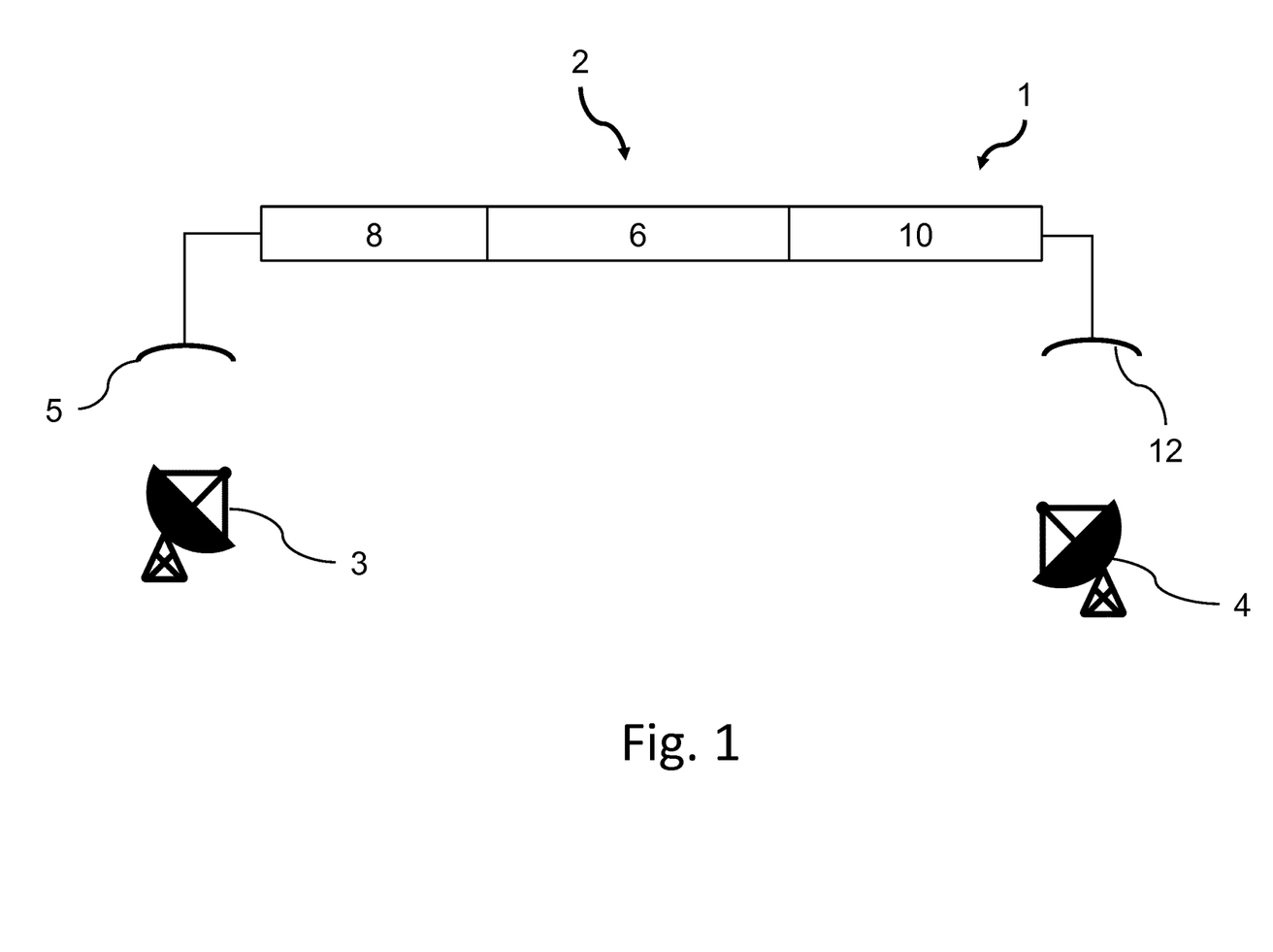
FIG. 1 shows a schematic representation of an embodiment of a satellite communications system according to the invention, based on a digital regenerative payload.

FIG. 1 shows an embodiment of a satellite communications system 1 of the present invention with a satellite 2, a transmitting station 3 and a receiving station 4 in form of a ground station positioned on the Earth's surface. The satellite comprises any kind of receiving antenna 5, a typical analog-to-digital receive section 8, a spatial digital modulator 6 and a typical digital-to-analog transmit section 10, as well as one transmitting antenna 12. To form multiple beams on the Earth's surface different technical realizations of the transmitting antenna 12 can be implemented such as single-feed-per-beam, multiple-feeds-per-beam or a direct radiating array.

The spatial digital modulator 6 modulates an incoming bit stream by dividing the bit stream into symbols of a linear symbol alphabet that are to be transmitted to the ground station, i.e. ground station 4 (so-called transmit symbols). Each symbol contains a specific number of bits that is given by the overall modulation order $m_{SM}$ of the spatial digital modulator 6. The spatial digital modulator 6 allocates the generated transmit symbols to beams that shall be radiated to the ground station 4. I.e., a beam index is assigned by the spatial digital modulator 6 to each transmit signal. In the embodiment, the beams are downlink beams.

Figure 3:
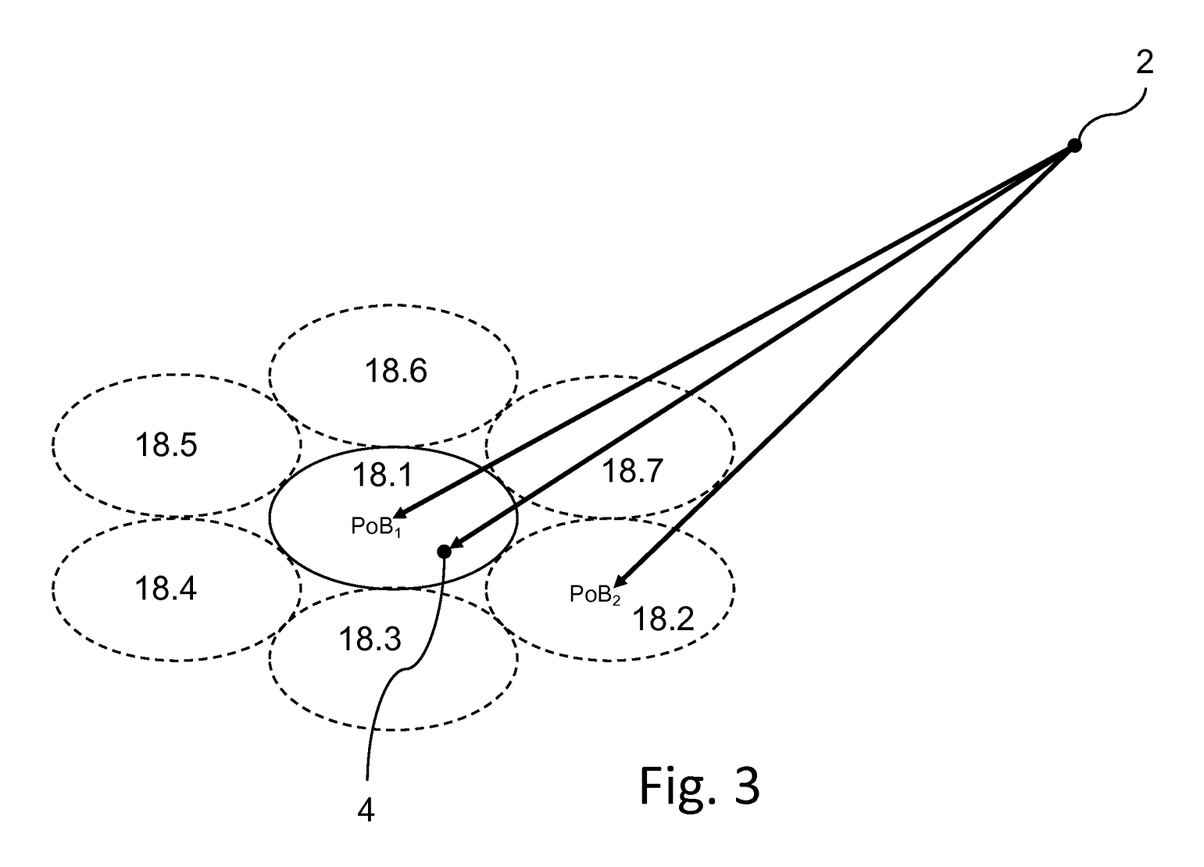
FIG. 3 shows an exemplary positioning of a receiving station inside a beam pattern produced by the several antennas of the satellite communications system of the invention.

The modulated transmit symbols are each modulated by the transmit section 10 to an analog carrier signal, each symbol representing a particular state of/change in the carrier signal. The transmit section typically consists of multiple channels with a digital-to-analog converter, up-converter, amplifier and filter. In each channel the signal for one beam is generated. The modulated carrier signals are then transmitted via the beam-forming antenna 12 to generate the beams at the ground of the satellite communications system 1 whose contours, in particular their points of boresight PoB are not co-located, as can be seen in FIG. 3.

Figure 2:
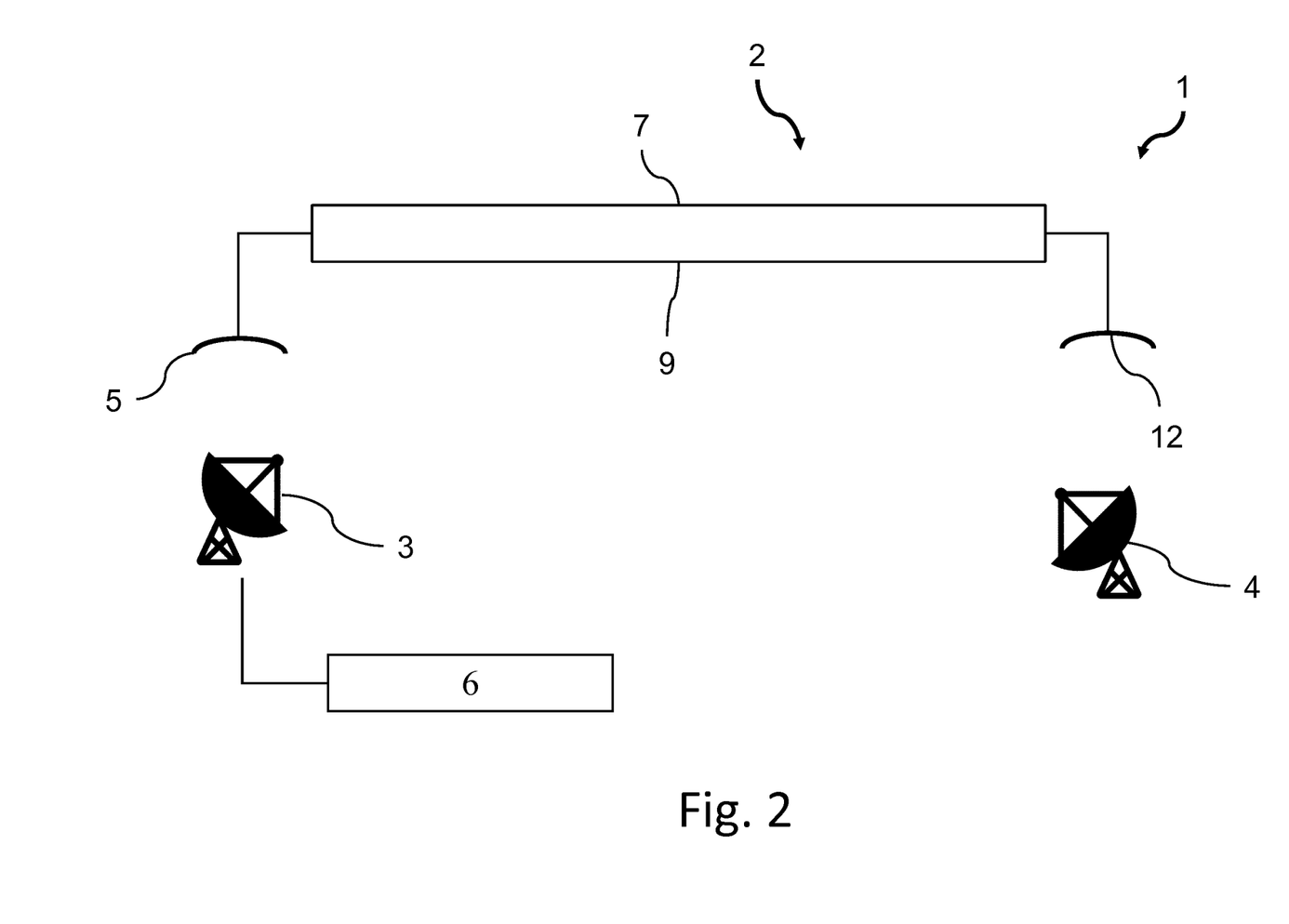
FIG. 2 shows a schematic representation of an embodiment of a satellite communications system according to the invention, based on a transparent (analog or digital) payload and the spatial modulator at the transmitting ground station.

Spatial modulation is also possible with a transparent payload 7 which can be digital or analog. This is shown in FIG. 2. In this case the spatial modulated signals are generated by the spatial digital modulator 6 at the transmitting ground station 3. The transparent payload 7 consists of multiple channels (transponders). Each of them receives, converts and amplifies the signal for one beam.

The transmitted equivalent isotropic radiated power (EIRP) of each downlink beam vary with the location of the receiving station within the footprint (the beam contour). The wanted receiving station 4 is thus preferentially positioned within the beam contour of the main beam 18.1 and the beams required for transmission of the transmit symbols are preferably selected in such manner from the maximum number of beams, in particular from the remaining beams 18.2-18.7, that the selected beams have the highest off-axis gain at the location of the receiving station 4.

According to the present invention the number of beams required for transmission of the symbol alphabet, i.e., for each distinct symbol of the symbol alphabet, depends on the intended overall modulation order $m_{SM}$ of the satellite communications system 1 as well as the intended modulation order in each beam.

The transmit symbols can be either encoded by a combination of space-shift keying and amplitude-phase-shift keying, wherein each transmit symbol is allocated to a specific beam (assigned a specific beam index) based on predefined fixed mapping rules.

Figure 4:
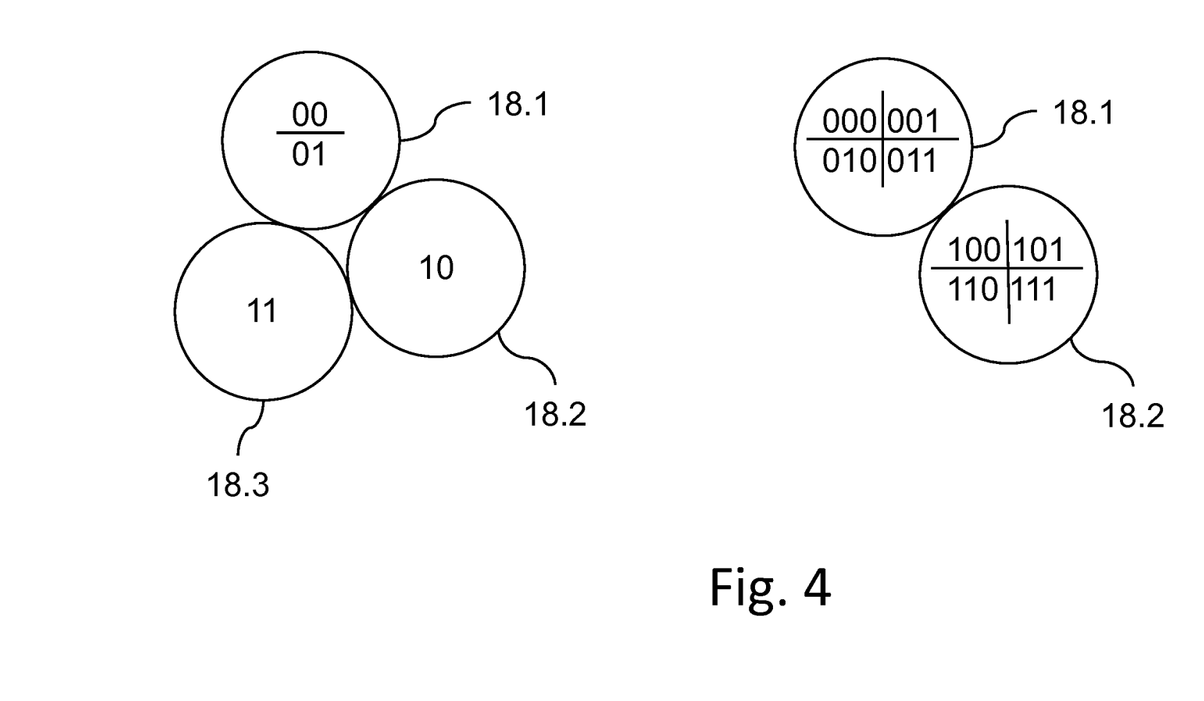
FIG. 4 shows exemplary spatial modulations achieved with the present invention, using 2 and 3 beams.

As can be seen from FIG. 4 (left-hand side), for an exemplary overall modulation order $m_{SM}$ of 2, i.e., two bits per symbol, the symbols 00 and 01 are allocated to the main beam 18.1 with beam index 1, whereas the symbols 10 and 11 are allocated to the second and the third beam 18.2 and 18.3, respectively. The symbols 00 and 01 in the main beam are modulated by binary-phase-shift keying (so-called APM symbols of binary-phase-shift keying) and the symbols 10 and 11 are each modulated by space-shift keying. The phases and amplitudes of each symbol are chosen to provide maximum Euclidean distance at the receiver site.

In another example, the spatial digital modulator 6 of the satellite 2 of the satellite communications system 1 employs a spatial modulation scheme based on amplitude-phase modulation only, whose modulation order is the overall modulation order $m_{SM}$ for encoding the transmit symbols that shall be transmitted via the main beam 18.1 and one adjacent beam, e.g. beam 18.2. For a modulation order of $m_{SM}$ of 3, i.e., three bits per symbol, the symbols 000, 001, 010, 011 are allocated to the main beam 18.1, whereas the symbols 100, 101, 110, 111 are allocated to the second beam, respectively (see FIG. 4, right-hand side). In case of an intended overall modulation order $m_{SM}$ of 3, for example quadrature-phase-shift keying (QPSK) may be used to modulate the main beam and the adjacent beam.

Figure 5:
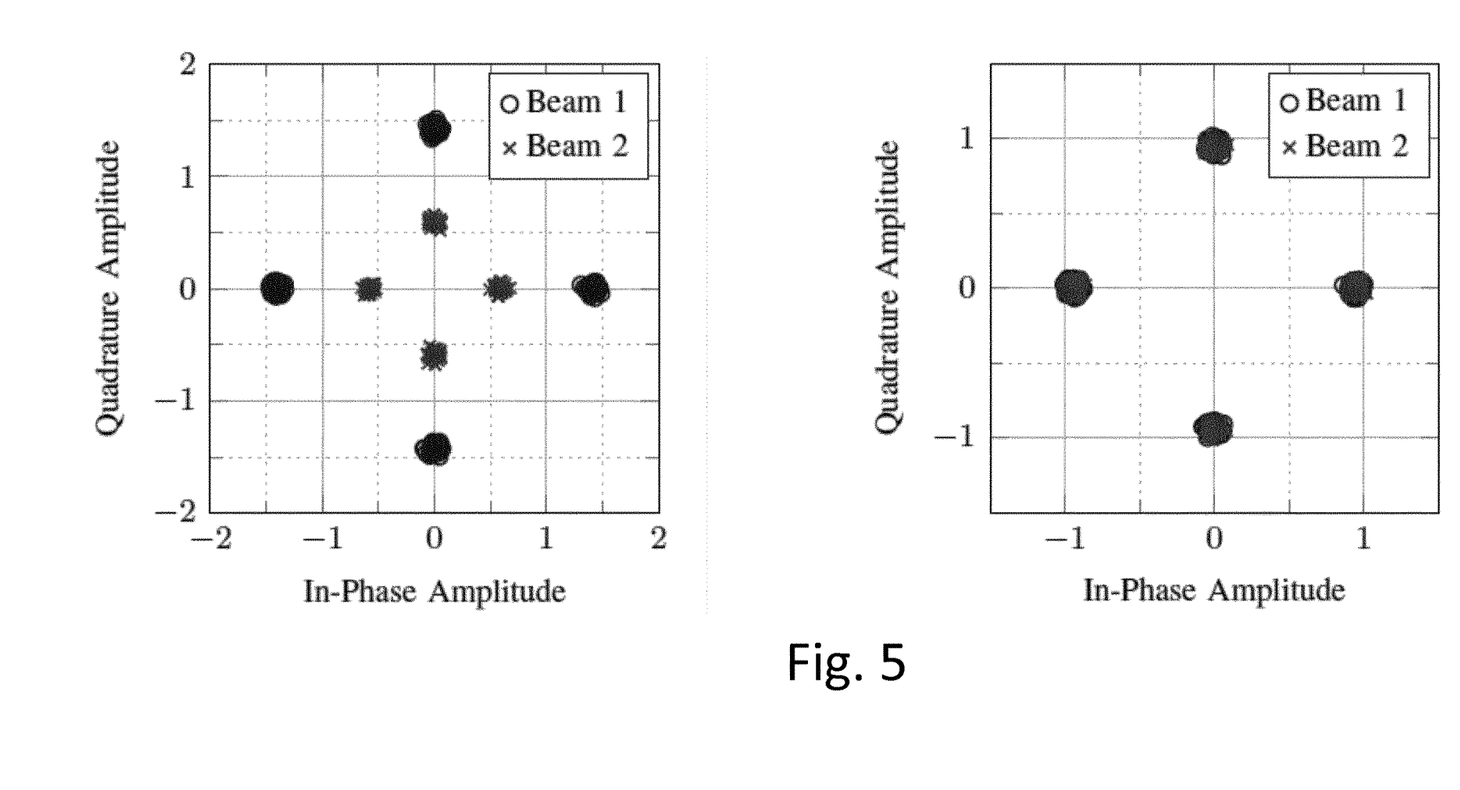
FIG. 5 shows a constellation diagram achieved with the present invention at the wanted (left hand side) and at the eavesdropper's position (right hand side).

For each signal path from the spatial digital modulator 6 on board of the satellite 2 via the respectively activated antenna per transmit symbol a phase shift is caused by different path lengths, attenuation/damping, manufacturing technology tolerances or hardware imperfections. These phase shifts of each signal path for each transmit symbol and the beam gain at the receiver ground station location 4 must be considered in the spatial modulator to optimize the Euclidian distances in the complex plane at the receiving ground station 4. An exemplary constellation diagram for an overall modulation order $m_{SM}$ of 3 using two QPSK modulated signals in two beams is shown in FIG. 5 (left hand side). The constellation points on the outside represent the symbols transmitted with the beam 18.1 (beam 1), the constellation points on the inside represent the symbols transmitted with the beam 18.2 (beam 2). FIG. 5 (right hand side) shows the best case for eavesdropping resistance at the eavesdroppers' locations. The amplitudes of beam 18.1 and beam 18.2 are equal, so the eavesdropper is not able to detect which beam has transmitted the amplitude-phase-modulated symbol.

LIST OF REFERENCE SIGNS 1 satellite communications system
2 satellite
3 transmit station
4 receiving station
5 receiving antenna
6 spatial digital modulator
7 transparent payload
8 typical receive section
10 typical transmit section
12 transmitting antenna 18.1-18.7 beams
PoB point of boresight

The invention claimed is:

1. A satellite communications system comprising a satellite with a spatial digital modulator for modulating an incoming bit stream to transmit in multiple beams,
wherein the spatial digital modulator is configured to generate transmit symbols by dividing the incoming bit stream into symbols of a symbol alphabet and to allocate each transmit symbol to a specific beam, and
wherein the spatial digital modulator is configured to allocate each transmit symbol to a specific beam based on fixed or dynamic mapping rules, and
wherein a receiving station is provided, and the spatial digital modulator is configured to select the beams required for transmission of the symbol alphabet such that they have the highest off-axis gain at the location of the receiving station.

2. A satellite communications system according to claim 1, wherein the spatial digital modulator is configured to use an amplitude-phase-shift-keying or space-shift-keying modulation scheme for encoding the one or more transmit symbols that are allocated to different beams.

3. A satellite communications system according to claim 1, wherein the satellite is configured to add artificial noise to the transmit symbols.

4. A satellite communications system according to claim 1, wherein the spatial digital modulator is configured to select the beams required for transmission of the symbol alphabet such that the average load is balanced between each transmit section.

5. A satellite communication system according to claim 4, wherein the satellite is configured to adjust the signal power in the required beams such that the Euclidian distances between the transmit symbols received at the receiving station is optimized while minimizing the service area produced by the beam pattern on ground.

6. A satellite communication system according to claim 1, wherein the spatial modulator is placed in the digital satellite payload.

7. A satellite communication system according to claim 1, wherein the spatial modulator is placed at the transmitter ground station.

8. A satellite communication system according to claim 1, wherein the service area is controlled by the code rate of the channel coding of the transmitted bit stream.

9. A satellite communication system according to claim 1, wherein the spatial modulator is combined with MIMO communication to increase eavesdropping resistance.

10. A satellite communication system according to claim 1, wherein the satellite is configured to adjust the signal power in the required beams such that the Euclidian distances between the transmit symbols received at the receiving station is optimized while minimizing the service area produced by the beam pattern on ground.

11. A satellite communications system comprising a satellite with a spatial digital modulator for modulating an incoming bit stream to transmit in multiple beams, wherein the spatial digital modulator is configured to generate transmit symbols by dividing the incoming bit stream into symbols of a symbol alphabet and to allocate each transmit symbol to a specific beam, and
wherein the spatial digital modulator is configured to allocate each transmit symbol to a specific beam based on fixed or dynamic mapping rules, and
wherein the satellite is configured to adjust the signal power in the required beams such that the Euclidian distances between the transmit symbols received at a receiving station is optimized while minimizing the service area produced by the beam pattern on ground.

12. A satellite communications system according to claim 11, wherein the spatial digital modulator is configured to use an amplitude-phase-shift-keying or space-shift-keying modulation scheme for encoding the one or more transmit symbols that are allocated to different beams.

13. A satellite communications system according to claim 11, wherein the satellite is configured to add artificial noise to the transmit symbols.

14. A satellite communications system according to claim 11, wherein the spatial digital modulator is configured to select the beams required for transmission of the symbol alphabet such that they have the highest off-axis gain at the location of the receiving station.

15. A satellite communications system according to claim 11, wherein the spatial digital modulator is configured to select the beams required for transmission of the symbol alphabet such that the average load is balanced between each transmit section.

16. A satellite communication system according to claim 11, wherein the spatial modulator is placed in the digital satellite payload.

17. A satellite communication system according to claim 11, wherein the spatial modulator is placed at the transmitter ground station.

18. A satellite communication system according to claim 11, wherein the service area is controlled by the code rate of the channel coding of the transmitted bit stream.

19. A satellite communication system according to claim 11, wherein the spatial modulator is combined with MIMO communication to increase eavesdropping resistance.

* * * * *